Dec. 15, 1953  E. A. SIMPSON  2,662,307
READING-RATE DEVICE
Filed April 18, 1951  4 Sheets-Sheet 1
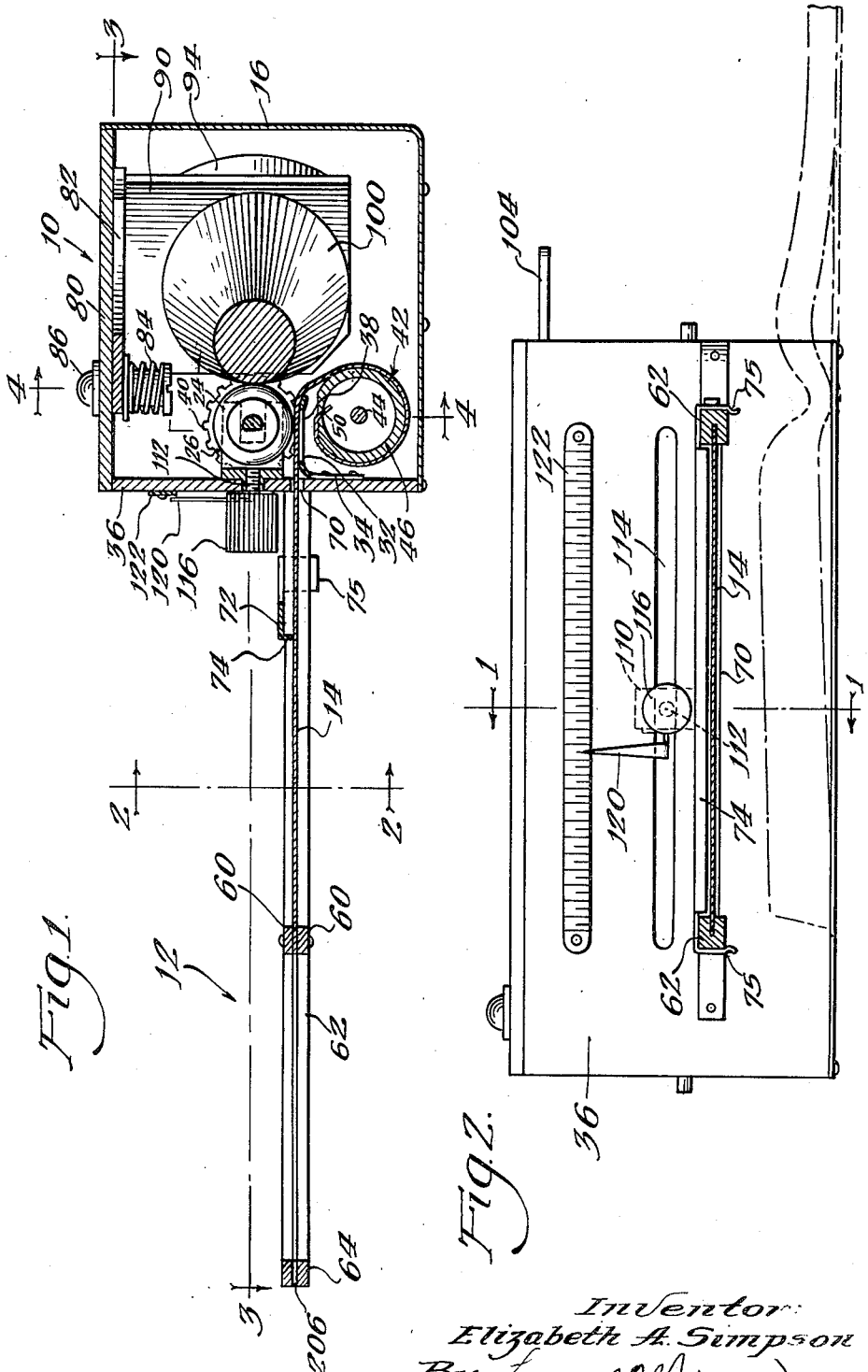
Inventor:
Elizabeth A. Simpson
By: Leonard Nieman
Attorney

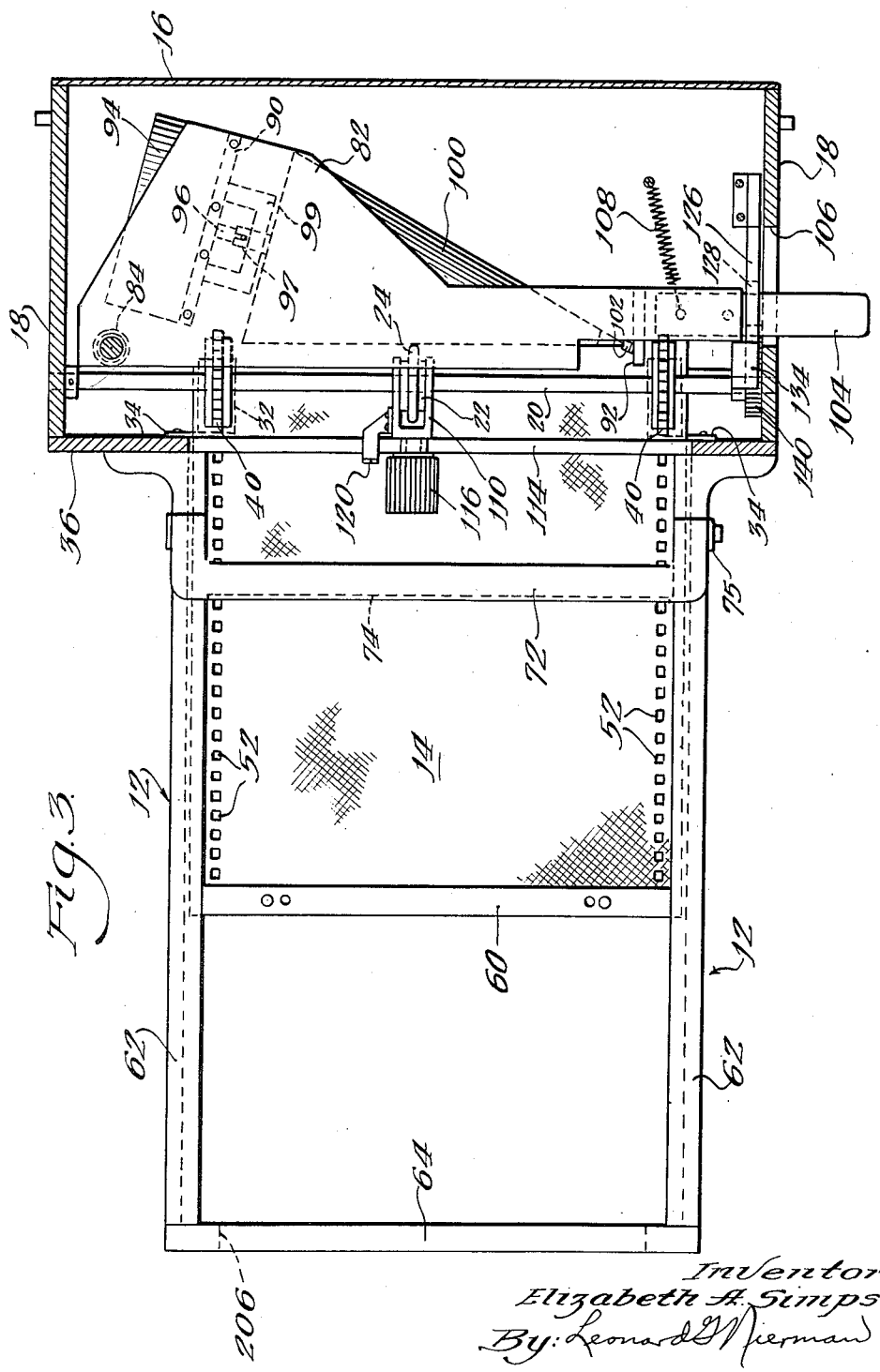

Dec. 15, 1953     E. A. SIMPSON     2,662,307
READING-RATE DEVICE
Filed April 18, 1951     4 Sheets-Sheet 3
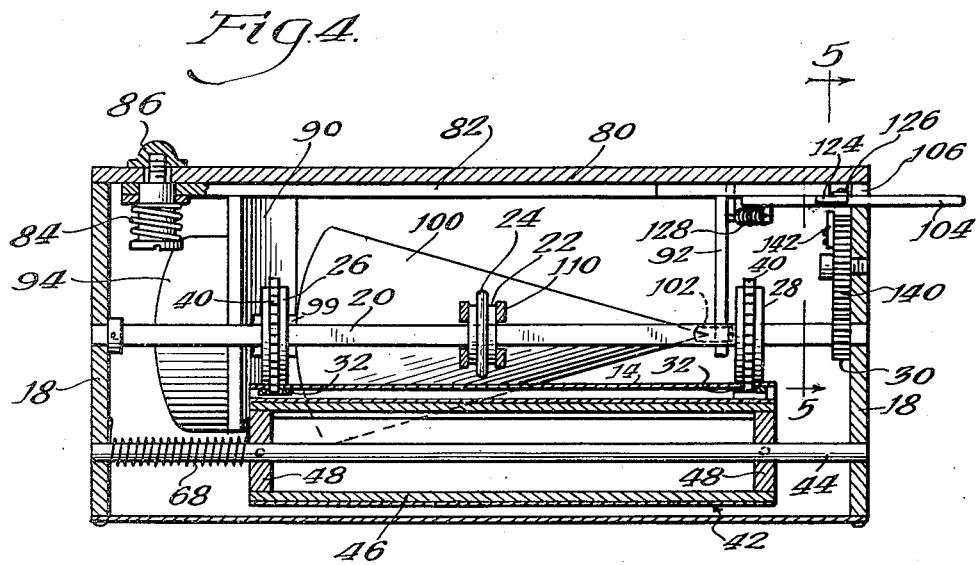
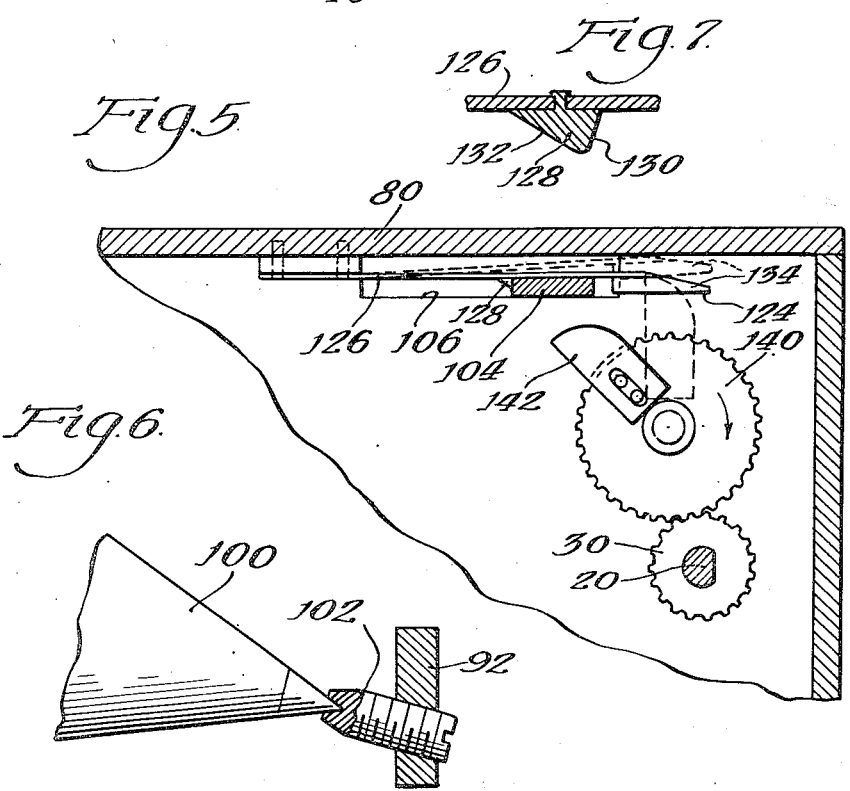
Inventor:
Elizabeth A. Simpson
By Leonard H. Newman
Attorney Dec. 15, 1953      E. A. SIMPSON      2,662,307
READING-RATE DEVICE
Filed April 18, 1951      4 Sheets-Sheet 4
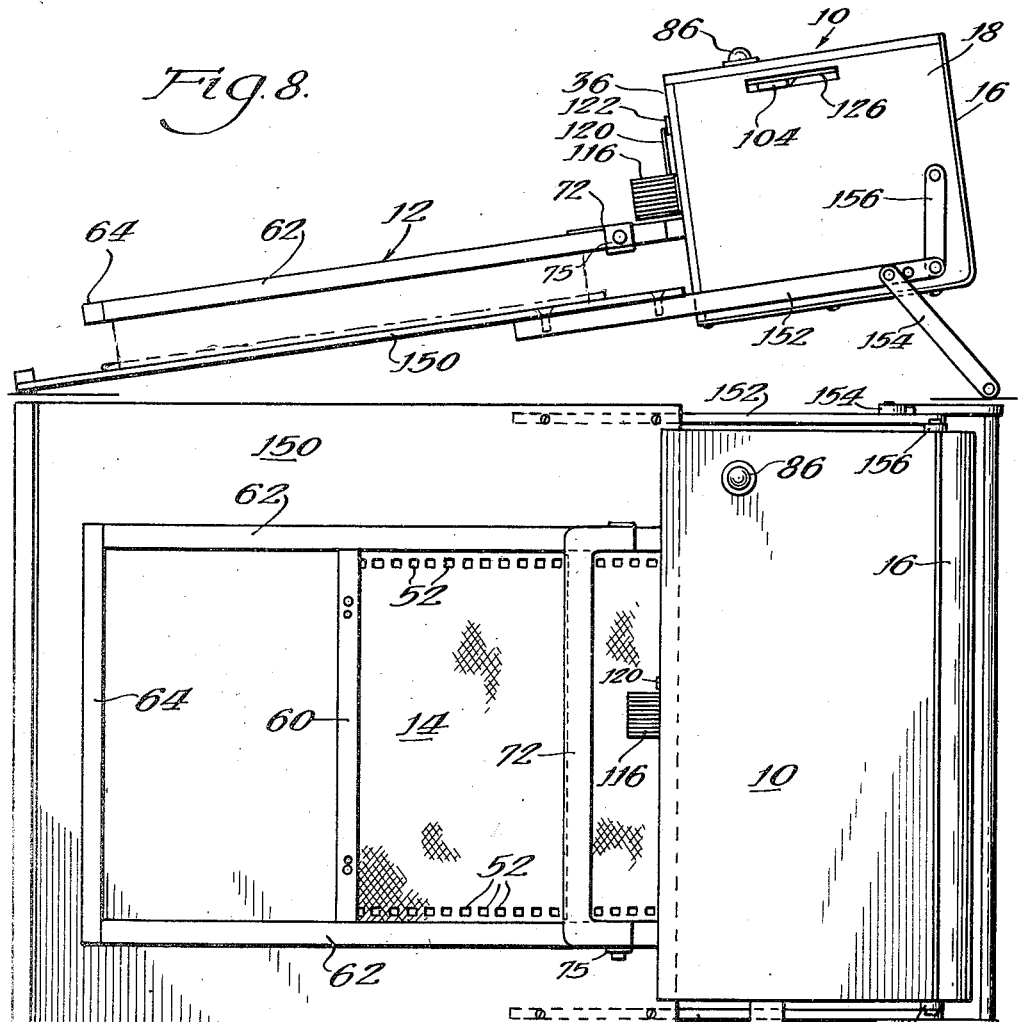
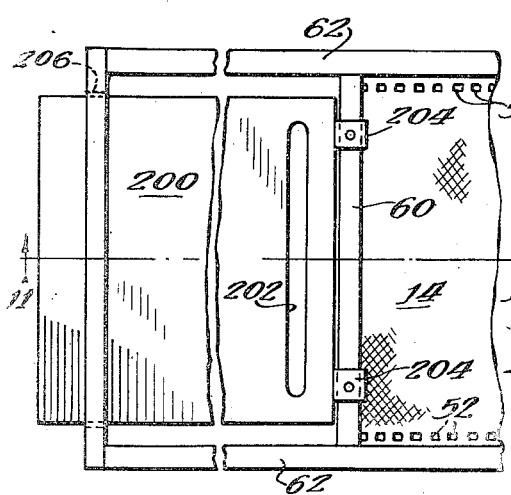
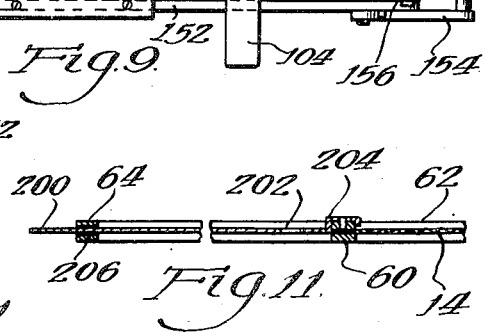

Patented Dec. 15, 1953

2,662,307

UNITED STATES PATENT OFFICE 2,662,307

READING-RATE DEVICE

Elizabeth A. Simpson, Chicago, Ill.

Application April 18, 1951, Serial No. 221,558

12 Claims. (Cl. 35—35)

This invention relates to a device for improving reading speed. Most particularly the invention relates to an improvement in the type of machine in which the reading-rate of the user is improved by masking off successive portions of a page in order to prevent re-reading of material previously read. The present application is a continuation-in-part of the applicant's application Serial No. 77,235, filed February 18, 1949.

It is now known that a common difficulty in attaining efficiency in reading is that the inefficient reader is prone to re-read the same material a number of times. It is therefore an established technique in the promotion of reading efficiency to continuously cover the material read with a masking curtain in order to aid the inefficient reader to become accomplished in absorbing the material being read upon a single perusal thereof. As practice is gained in this regard, the rate at which the masking curtain is moved over the printed matter is gradually increased. Thus, after an extended period of such practice, the reading ability and efficiency of most persons is found to be greatly improved.

Machines suitable for use in such teaching and practice have heretofore been devised. The ones in common use are adaptations of the machine first described at pages 67 to 69 of a monograph by Professor G. T. Buswell, entitled "Remedial Reading at the College and Adult Levels" published by the University of Chicago in November 1939, as No. 50 of a series entitled "Supplementary Educational Monographs."

The machines now employed in such remedial and developmental teaching of reading are subject to a large number of difficulties and inconveniences in use. The present invention provides a machine of the general type described above which is simple and convenient both in construction and use, and which is suitable for employment with many types of reading matter without disassembly or destruction of the reading matter.

For understanding of the invention, reference is made to the attached drawing, in which is illustrated a single embodiment of the invention in accordance with the patent laws. In the drawing:

Fig. 1 is a longitudinal vertical sectional view of a machine embodying the invention;

Fig. 2 is a front elevation, partly in section, taken along the line 2—2 of Fig. 1;

Fig. 3 is a plan view, partly in section, taken along the line 3—3 of Fig. 1;

Fig. 4 is a front sectional view taken along the offset line 4—4 of Fig. 1;

Fig. 5 is a fragmentary enlarged view taken along the line 5—5 of Fig. 4;

Fig. 6 is a fragmentary detailed view of a bearing support incorported in the embodiment illustrated;

Fig. 7 is a sectional view of a spring detent incorporated in the embodiment;

Fig. 8 is a side elevation of the machine together with a mounting and reading-matter support constituting a portion of the invention;

Fig. 9 is a plan view of the device of Fig. 8;

Fig. 10 is a plan view of a mask attachment illustrating the manner of attachment thereof; and Fig. 11 is a sectional view taken on the line 11—11 of Fig. 10.

Referring now to the drawing, the machine consists in general of a drive chassis generally indicated by the numeral 10, a reading frame 12 extending outward from the drive chassis 10 and an opaque straight-edged masking curtain 14, serving as a line-indicating member, movable over the frame 12, which supports and guides the line-indicating member for movement perpendicular to the straight edge thereof. The drive chassis 10 is contained within a housing 16. Journalled in the end walls 18 of the housing 16 is a shaft 20. Keyed to the shaft 20, which is flattened on one side, is a hub 22 having a flattened shaft opening and bearing a friction wheel 24 of rubber. The hub 22 is slideable along the shaft 20, but relative rotation between the wheel 24 and the shaft 20 is prevented by the aforementioned keying. Sprocket wheels 26 and 28 are rigidly mounted on the shaft 20 toward the sides of the machine. At the extreme end of the shaft 20, adjacent one of the side walls 18, is a spur gear 30 for purposes hereinafter to be described.

Immediately below the sprocket wheels 26 and 28 are upwardly facing spring supports 32 having vertical portions 34 secured to the front wall 36 of the housing 16. The supports 32 are longitudinally slotted at 38, to receive the ends of the teeth 40 of the sprocket wheels 26 and 28. Beneath the supports 32 is a roller 42 mounted on a shaft 44 which traverses the housing 16. The roller 42 comprises a tube 46 closed at the ends by discs 48, which are secured to the shaft 44. The tube 46 is longitudinally slotted at 50 and flattened adjacent the slot. Through the slot 50 is threaded the end of the opaque masking curtain 14, of plastic film or other suitably flexible material. The masking curtain 14 has spaced apertures 52 along the margins thereof, receiving the teeth 40 of the sprocket wheels 26 and 28. The outer end of the masking curtain 14 is clamped between a pair of rigid members 60. Mounted on the front of the housing 16, and extending forward therefrom, is the frame 12, comprising side members 62 secured to an outer end member 64. The side members 62 are slotted on the inner surfaces thereof to receive the outer edges of the masking curtain 14. The rigid end members 60 attached to the masking curtain 14 are of lesser width than the curtain 14 and slide between the side members 62. The roller 42 is spring biased by a torsion spring 68 which is wound around the end of the shaft 44, one end being attached to the roller 42, and the other end to the side wall 18, in such a direction as to roll the curtain 14 onto the roller 42 in the absence of other forces. The front wall 36 of the housing 16 is slotted at 70, and the curtain 14 enters the frame 12 through this slot. Upon the frame 12 is mounted a stop or limit member 72 which may be adjusted in position along the frame 12 and which has a portion 74 extending between the side members 62 of the frame sufficiently to engage the upper rigid member 60 at the end of the curtain 14, and clamp portions 75 securing it to the side members 62, so that the side members 62 serve as tracks to which the limit member 72 is slideably clamped. The upper end member 60 thus serves as a limit member on the mobile assembly abutting against the limit member 72 on the stationary assembly to fix the upper end of the stroke of the line-indicating member.

It will be seen that in the absence of exterior force, the mechanism thus far described normally retains the outer end of the curtain 14 against the stop 72, which is thus adjustable in position. It will further be seen that rotation of the wheel 24 in the appropriate direction rotates the sprocket wheels 26 and 28 to lower the curtain 14 over successive lines of reading material, engagement of the sprocket teeth 40 with the apertures 52 being made secure by the slotted spring supports 32. Upon the release of the wheel 24, the curtain immediately returns to the withdrawn position determined by the stop 72.

Pivoted on the cover 80 of the housing 16 is an eccentrically shaped plate 82 which is held flat against the cover 80 by a compression spring 84 mounted on the pivot 86. Depending from the horizontal eccentric plate 82 are vertical support plates 90 and 92 toward opposite ends thereof. Mounted on the outer surface of the vertical support 90 is a synchronous motor 94 having a shaft 96 protruding through the vertical support 90 and coupled to a shaft 97 protruding from the center of the base of a cone member 100, the apex of the cone being journalled in the end of a bearing screw 102 threaded through the opposite support plate 92, and the shaft 97 being journalled in a bracket 99 secured to the support plate 90. To the under surface of the outer end of the plate 82 is secured the inner end of a lever 104, the outer end of which protrudes from the drive chassis 10 through slot 106 in the side wall 18. A tension spring 108 having one end secured to the lever 104 and the other end to the cover 80, biases the plate 82 toward the rotational position wherein the outer end of the plate 82 is toward the back of the drive chassis, the limit of motion being fixed by the back end of the slot 108 (this position is not illustrated). When the lever 104 is drawn forward, the front surface of the cone 100 is substantially parallel with the shaft 20 and engages the wheel 24 irrespective of the position of the hub 22 along the shaft 20. The cone 100 may be engaged and disengaged from the wheel 24 by movement of the lever 104, and the speed of motion of the wheel 24 induced by the constant speed motor 94 is variable in an extremely large ratio by variation of the position of the wheel 24 along the shaft 20, the variation being continuous rather than in discrete steps.

It will be seen that with the mechanism thus far described, engagement of the cone 100 with the wheel 24 by forward motion of the lever 104 commences motion of the curtain 14 outward over the frame 12. Upon release of the lever 104, the cone 100 is disengaged from the wheel 24 by the spring 108, and the curtain 14 is returned to the position determined by the stop 72. Movement of the wheel 24 along the shaft 20 to vary the drive speed of the curtain 14 is accomplished by means of a guide yoke 110 which bears against the hub 22 on either side without interfering with the rotation thereof, the yoke 110 having a bolt 112 protruding out through the slot 114 in the front plate 36, a knob 116 being threaded onto the bolt 112 and serving both to permit adjustment of the position of the yoke and the locking thereof by tightening of the knob 116 upon the bolt 112. A pointer 120 secured to the yoke and a scale 122 on the chassis 10 provide a speed calibration.

Attached to the cover plate 80 and extending along the slot 106 parallel with the cover plate 80 is a spring detent 124 having an elongated flat spring member 126, to the under surface of which is secured a catch member 128. The catch member 128 has an abruptly sloping surface 130 and a gently sloping surface 132. When the lever 104 is pulled forward from its normally rearward position, it engages the gradually sloping surface 132 to raise the detent 124. When the lever 104 is sufficiently forward so that the cone 100 engages the wheel 24, the detent snaps back into the lowered position, and the lever 104 is locked in place, the sloping surface 130 aiding in urging the cone 100 into secure engagement with the wheel 24.

At the extreme outer end of the detent 124 is a shoe 134. Meshing with the gear 30 at the end of the shaft 20 is an idler gear 140 journalled in the side wall 18. Secured to the surface of the idler gear 140, which is of larger diameter than the gear 30, is a lever cam 142, which strikes the shoe 134 to release the detent 124 and allow the lever 104 to return to the normal position in which the cone 100 is disengaged from the wheel 24. The cam 142 is thus a limit member on the mobile assembly abutting against the shoe 134, which thus constitutes a limit member on the stationary assembly, to fix the lower end of the stroke of the line-indicating member. When the detent 124 is thus disengaged, the spring 68 serves not only to withdraw the curtain 14 but also drives the sprockets 26 and 28 and thus the gear 140 back to a fixed position determined by the position of the curtain stop 72. Thus, the point at which the detent 124 is disengaged by the cam 142 is constant irrespective of the speed of the motor or of the preset withdrawn position of the curtain 14 as determined by the stop 72. The position of the cam 142 is such that it disengages the detent 124 when the curtain reaches a point where the outer end 60 is immediately adjacent the outer end 64 of the frame. The machine is therefore adjustable to any length of page of reading matter. Upon completion of a page, the curtain automatically withdraws to the retracted position corresponding to the top line and is ready for the reading of another page.

It will be noted that with the construction shown, the cone mechanism and motor are mounted substantially independently of the rest of the drive mechanism, and may readily be withdrawn for servicing or replacement by removal of the cover plate 80.

In Fig. 8 is shown the machine described above together with a combination machine-mount and reading board. To the board 150 are attached extension arms 152, to which is attached a foldable support 154. The drive chassis 10 is mounted on the extension arms 152 by links 156, the chassis 10 being pivoted upon the links 156 on a horizontal axis rearward of the center of gravity of the machine and the links 156 being pivoted on the arms 152. A book or other reading matter may be placed on the board 150 beneath the frame 12, which thus rests on the reading matter, and it is necessary merely to grasp the frame 12 to tip the machine to swing the line-indicating member away from the reading material support in order to replace the reading material or to turn the page when a book or similar matter is employed without disturbing the setting of the stroke of the line-indicating member. The double pivoting of the links 156 maintains the frame 12 substantially parallel with, and resting upon, the reading material, irrespective of the thickness of the book employed.

In Figures 10 and 11 is illustrated a mask attachment whereby the machine illustrated may be employed as a tachistoscope for instantaneous viewing of words and symbols. Tachistoscopic instruments commonly employed in teaching and testing of reading ability have heretofore been separate from instruments of the progressive masking type described in the introductory portion hereof. The mask attachment of Figures 10 and 11 consists of a masking sheet 200 having a viewing slit 202 and tabs or hooks 204 removably fastening the sheet 200 to the rigid member 60 at the outer end of the masking curtain 14. The sheet 200 slides through a slot 206 in the outer end member 64 of the frame 12.

It will be seen that the machine illustrated and described above incorporates features which render it of broad utility in remedial and developmental teaching and practice of reading. The structural features which render the machine usable with a large variety of reading materials are particularly advantageous, in addition to the adaptability of the machine to tachistoscopic use. With a machine such as that illustrated, teaching or practice need not be done with materials specially prepared for the purpose; the reader may employ any ordinary reading material which he would read for other purposes, such as for entertainment, education, and similar normal reading. It is found that the great majority of books of the familiar "stiff-bound" type which are commonly found in home libraries and used for extended reading, recreational or otherwise, such as fiction, biography, etc., have a typographical page height (total page height less margins) of approximately from 5½ to 7 inches. Thus a machine wherein the total stroke of the masking or line-marking member as defined by a shiftable stop member is variable between 5½ and 7 inches is adequate to permit convenient utilization of a considerable segment of the reading materials commonly encountered. The ratio of the maximum stroke of the masking member to the minimum stroke should be at least 7 to 6 to provide ease of operation with a substantial diversity of common reading material. In order to provide in addition adaptability to such relatively small reading materials as the popular paper-bound pocket-size books, which are as small as approximately 4 inches in typographical page height, and such relatively large reading materials as encyclopedias, magazines, and legal, medical and other scientific and technical books, which commonly are of a typographical page height of 8 inches or more, the ratio of the maximum stroke to the minimum stroke should be at least 2 to 1. In the embodiment of the invention illustrated, the minimum stroke of the shutter is essentially zero, thus facilitating use of the machine with small materials such as symbol cards and similar educational and test materials. Continuous adjustability for size, as opposed to adjustability in discrete steps is provided in the illustrated embodiment.

It will be understood that the embodiment of the invention herein illustrated is capable of a large number of changes and modifications without departing from the spirit of the invention. Persons skilled in the art, upon examination of the foregoing description and of the drawing, will readily devise many machines which, although far different in appearance, nevertheless embody the teachings of the invention. The scope of the invention shall therefore be deemed limited only by the appended claims.

What is claimed is:

1. In a reading device comprising a line-indicating member having a straight edge, guide means supporting and guiding the line-indicating member for movement in a direction perpendicular to the straight edge, drive means coupled to the line-indicating member to drive the line-indicating member in said direction, a reading material support, and means connecting the guide means and the reading material support to hold the guide means and the reading material support in such relative position that said motion of the line-indicating member progresses the straight edge over successive lines of reading material which may be placed on the reading material support, the improvement wherein the means connecting the guide means and the reading material support comprises a rigid linking member, a pivotal connection connecting the guide means and the linking member, and a pivotal connection connecting the linking member and the reading material support, whereby the path of the line-indicating member may be maintained parallel to reading material resting on the reading material support despite variations of the distance between the line-indicating member and the reading material support made to accommodate varying thicknesses of reading material, and the line-indicating member may be swung away from the reading material support for replacement or turning of pages of the reading material.

2. In a device for improving reading ability comprising a line-indicating member having a straight edge, means for supporting and guiding the line-indicating member for movement in a direction perpendicular to the straight edge, drive means coupled to the line-indicating member to drive the line-indicating member in a direction perpendicular to the straight edge at manually selected constant speeds, and means for mounting said elements in operative relation, the improvement comprising a tachistoscopic masking sheet having at least one viewing aperture therethrough, and cooperating disengageable fastening means on the line-indicating member and on the tachistoscopic masking sheet, whereby the device may be employed as a progressive line-indicating device or as a tachistoscope.

3. The device of claim 2 wherein there are provided a transverse member and means for supporting said transverse member in the plane of motion of the line-indicating member, and parallel therewith, said transverse member having a slot therethrough adapted to support and guide the tachistoscopic masking sheet.

4. In a reading device, in combination, a straight-edged line-indicating member adapted to be progressed over reading material, a constant-speed drive, a forward coupling connecting the drive to the line-indicating member to drive the member, means to guide the line-indicating member over reading material in a direction perpendicular to the said edge, position-responsive means to disengage said forward coupling between the drive and the line-indicating member when the latter reaches a predetermined position, retracting means coupled to the line-indicating member to reverse the motion thereof when the forward coupling is so disengaged, and means to mount said elements in operative relation as aforesaid.

5. In a device for improving reading speed comprising a stationary assembly adapted to be placed on a table and having a reading material support portion adapted to position and support reading materials, a mobile assembly mounted on said stationary assembly including a straight-edged line-indicating member, means for guiding the line-indicating member for forward and return motion over successive lines of such reading material in a direction perpendicular to the straight edge, drive means coupled to the line-indicating member to drive it in the forward direction over the reading material, and cooperating limit members respectively on the stationary assembly and on the mobile assembly, a limit member on the mobile assembly abutting against a limit member on the stationary assembly to fix one end of the stroke of the line-indicating member and a limit member on the mobile assembly abutting against a limit member on the stationary assembly to fix the opposite end of the stroke of the line-indicating member, the improved construction wherein there are provided means for varying the position of at least one of said limit members along the direction of relative motion between such limit member and its cooperating limit member to vary the length of the stroke, the ratio of the longest stroke to the shortest stroke fixed by said limit members being at least 7 to 6, and means for swinging the line-indicating member away from the reading material support portion of the stationary assembly, so that the stroke of the line-indicating member may be set to correspond with the height of the reading material on the support, and pages of the reading material may be turned without disturbing this setting.

6. The device of claim 5 wherein the longest stroke of the line-indicating member is at least 7 inches and the shortest stroke is at most 5½ inches.

7. The device of claim 5 wherein the shortest stroke is substantially zero, so that the device may be used with symbol cards and similar materials.

8. The device of claim 5 wherein said one limit member is slideable upon its assembly, so that the stroke may be continuously varied.

9. In a device for improving reading speed comprising a stationary assembly adapted to be placed on a table and having a reading material support portion adapted to position and support reading materials, a mobile assembly mounted on said stationary assembly including a straight-edged line-indicating member, means for guiding the line-indicating member for forward and return motion over successive lines of such reading material in a direction perpendicular to the straight edge, drive means coupled to the line-indicating member to drive it in the forward direction over the reading material, and cooperating limit members respectively on the stationary assembly and on the mobile assembly, a limit member on the mobile assembly abutting against a limit member on the stationary assembly to fix one end of the stroke of the line-indicating member and a limit member on the mobile assembly abutting against a limit member on the stationary assembly to fix the opposite end of the stroke of the line-indicating member, the improved construction wherein there are provided a track extending along the direction of relative motion between one of said limit members and its cooperating member, said one limit member being slideably clamped to the track to constitute means for varying the length of the stroke of the line-indicating member, the length of said track being such that the ratio of the longest stroke to the shortest stroke fixed by said limit members is at least 7 to 6, and means for swinging the line-indicating member away from the reading material support portion of the stationary assembly, so that the stroke of the line-indicating member may be set to correspond with the height of the reading material on the support, and pages of the reading material may be turned without disturbing this setting.

10. In a device for improving reading speed comprising a stationary assembly adapted to be placed on a table and having a reading material support portion adapted to position and support reading materials, a mobile assembly mounted on said stationary assembly including a straight-edged line-indicating member, means for guiding the line-indicating member for forward and return motion over successive lines of such reading material in a direction perpendicular to the straight edge, drive means coupled to the line-indicating member to drive it in the forward direction over the reading material, and means on the stationary assembly and the mobile assembly for limiting the motion of the line-indicating member in both the forward and return directions, the improvement comprising means on at least one of said assemblies for substantially varying at least one of the limits of motion to vary the stroke of the line-indicating member, and means for swinging the line-indicating member away from the reading material support portion of the stationary assembly, so that the stroke of the line-indicating member may be set to correspond with the height of the reading material on the support, and pages of the reading material may be turned without disturbing this setting.

11. In a device for improving reading speed comprising a reading frame including two side members adapted to be placed over reading material, a line-indicating member having a straight edge extending transversely of the frame and adapted to be moved in both directions along the frame, and means coupled to the line-indicating member to drive the line-indicating member longitudinally of the frame at manually selectable constant speeds, the improvement comprising a stop member having end portions guidingly supported on the side members of the frame and slideable thereon and a central portion against which a portion of the line-indicating member abuts to define one end of the path of motion of the line-indicating member.

12. In a device for improving reading speed comprising a stationary assembly adapted to be placed on a table and having a reading material support portion adapted to position and support reading materials, a mobile assembly mounted on said stationary assembly including a straight-edged line-indicating member, means for guiding the line-indicating member for forward and return motion over successive lines of such reading material in a direction perpendicular to the straight edge, drive means coupled to the line-indicating member to drive it in the forward direction over the reading material, and means on the stationary assembly and the mobile assembly for limiting the motion of the line-indicating member in both the forward and return directions, the improved construction wherein there are provided on the stationary assembly a rigid linking member, a pivotal connection connecting the means for guiding the line-indicating member to the linking member, and a pivotal connection connecting the linking member and the reading material support, and there are provided on at least one of said assemblies means for substantially varying at least one of the limits of motion to vary the stroke of the line-indicating member.

ELIZABETH A. SIMPSON.

References Cited in the file of this patent

UNITED STATES PATENTS

| Number | Name | Date |
| --- | --- | --- |
| 1,587,886 | Whitmore | June 8, 1926 |
| 2,098,020 | Wheeler | Nov. 2, 1937 |
| 2,265,924 | Oerter et al. | Dec. 9, 1941 |